US011738487B2

(12) United States Patent
Montgomery et al.

(10) Patent No.: US 11,738,487 B2
(45) Date of Patent: *Aug. 29, 2023

(54) PROCESSES FOR MAKING MOLDED FLEXIBLE FOAMS AND FLEXIBLE FOAMS PRODUCED THEREBY

(71) Applicant: Covestro LLC, Pittsburgh, PA (US)

(72) Inventors: Michelle L. Montgomery, Pittsburgh, PA (US); Brandon W. Parks, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,521

(22) Filed: Jan. 22, 2021

(65) Prior Publication Data

US 2022/0234262 A1 Jul. 28, 2022

(51) Int. Cl.
| | |
|---|---|
| B29C 44/34 | (2006.01) |
| C08G 18/22 | (2006.01) |
| C08G 18/30 | (2006.01) |
| C08G 18/32 | (2006.01) |
| C08G 18/48 | (2006.01) |
| C08G 18/50 | (2006.01) |
| C08G 18/66 | (2006.01) |
| C08G 18/76 | (2006.01) |
| B29K 75/00 | (2006.01) |
| C08G 101/00 | (2006.01) |

(52) U.S. Cl.
CPC ...... B29C 44/3492 (2013.01); B29C 44/3442 (2013.01); C08G 18/222 (2013.01); C08G 18/227 (2013.01); C08G 18/302 (2013.01); C08G 18/5021 (2013.01); B29K 2075/00 (2013.01); C08G 2101/00 (2013.01); C08G 2110/0008 (2021.01); C08G 2110/0041 (2021.01); C08G 2110/0083 (2021.01)

(58) Field of Classification Search
None
See application file for complete search history.

(56) References Cited

U.S. PATENT DOCUMENTS

| | | | |
|---|---|---|---|
| 4,217,247 A | | 8/1980 | Szabat et al. |
| 4,263,408 A | | 4/1981 | Meyborg et al. |
| 4,353,995 A | | 10/1982 | Szabat et al. |
| 4,876,292 A | * | 10/1989 | Milliren ............ C08G 18/6685 521/159 |
| 5,156,915 A | | 10/1992 | Wilson et al. |
| 5,159,012 A | | 10/1992 | Doesburg et al. |
| 5,401,824 A | | 3/1995 | Clatty et al. |
| 5,672,636 A | * | 9/1997 | Horn ................. C08G 65/2624 564/512 |
| 6,506,813 B1 | * | 1/2003 | Parfondry ............ C08G 18/482 252/182.25 |
| 6,521,674 B1 | * | 2/2003 | Haley ................. C08J 9/14 521/137 |
| 6,590,057 B1 | | 7/2003 | Brecht et al. |
| 6,767,985 B2 | | 7/2004 | Freeland et al. |
| 6,825,238 B2 | | 11/2004 | Hohl |
| 7,361,695 B2 | * | 4/2008 | Tu ................. C08G 18/482 521/170 |
| 7,456,229 B2 | | 11/2008 | Hager et al. |
| 8,552,079 B2 | | 10/2013 | Clatty et al. |
| 8,912,113 B2 | | 12/2014 | Ravichandran et al. |
| 9,006,357 B2 | | 4/2015 | Yang et al. |
| 9,399,696 B2 | | 7/2016 | Borella et al. |
| 9,512,258 B2 | | 12/2016 | Franceschin et al. |
| 9,879,153 B2 | | 1/2018 | Wang et al. |
| 10,279,515 B2 | | 5/2019 | Holeschovsky et al. |
| 10,640,641 B2 | | 5/2020 | Ravichandran et al. |
| 2003/0100699 A1 | * | 5/2003 | Waddington ......... C08G 18/482 528/44 |
| 2006/0293486 A1 | | 12/2006 | Emmrich et al. |
| 2007/0129452 A1 | | 6/2007 | Clatty et al. |
| 2007/0213420 A1 | * | 9/2007 | Kimura .............. C08G 18/6677 521/99 |
| 2007/0270519 A1 | | 11/2007 | Anderson et al. |
| 2011/0190408 A1 | | 8/2011 | Casati et al. |
| 2012/0220677 A1 | * | 8/2012 | Williams ............ C08G 18/4018 521/123 |

(Continued)

FOREIGN PATENT DOCUMENTS

| | | | | |
|---|---|---|---|---|
| CA | 3123649 A1 | 6/2020 | | |
| CN | 100360497 C | 1/2008 | | |
| DE | 10227187 A1 | * 1/2004 | ............ | A43B 13/04 |
| DE | 102004011348 A1 | 9/2005 | | |
| GB | 1258357 A | 12/1971 | | |
| WO | 2017085327 A1 | 5/2017 | | |
| WO | 2019014593 A1 | 1/2019 | | |
| WO | 2020223059 A1 | 11/2020 | | |

OTHER PUBLICATIONS

Machine translation of DE-10227187-A1 obtained from the European Patent Office website in Dec. 2022.*

Primary Examiner — Melissa A Rioja
(74) Attorney, Agent, or Firm — Donald R. Palladino

(57) ABSTRACT

Processes for making a molded flexible foam. The processes include: (a) depositing a foam-forming reaction mixture onto a surface of a mold cavity, and (b) allowing the foam-forming reaction mixture to react in the mold cavity. The foam-forming reaction mixture comprises: (1) a polyisocyanate present in an amount of less than 45% by weight, based on the total weight of the foam-forming reaction mixture; (2) an isocyanate-reactive composition comprising at least 50% by weight, based on the total weight of polyol in the isocyanate-reactive composition, of a polyether polyol having a functionality of greater than 2, an oxyethylene content of 0 to 50% by weight, based on the total weight of the polyether polyol, more than 50 mol % of primary OH groups, and an OH number of 8 to 112 mg KOH/g; (3) a blowing agent comprising water present in an amount of at least 0.5% by weight, based on the total weight of the foam-forming reaction mixture; and (4) a tin-free metallic catalyst composition comprising a bismuth-based catalyst and a zinc-based catalyst.

20 Claims, No Drawings

(56) References Cited

U.S. PATENT DOCUMENTS

| | | | |
|---|---|---|---|
| 2012/0238656 A1* | 9/2012 | De Kesel | C08G 18/14 521/137 |
| 2012/0252916 A1* | 10/2012 | Sasaki | C08G 18/4825 521/123 |
| 2012/0302718 A1 | 11/2012 | Krause et al. | |
| 2014/0303321 A1 | 10/2014 | Burckhardt et al. | |
| 2016/0264716 A1 | 9/2016 | Cookson et al. | |
| 2016/0280837 A1 | 9/2016 | Feng et al. | |
| 2018/0230329 A1 | 8/2018 | Hoffmann et al. | |
| 2018/0273671 A1 | 9/2018 | Guo et al. | |
| 2018/0273672 A1 | 9/2018 | Monton Martin | |
| 2018/0282573 A1 | 10/2018 | Hoffmann et al. | |
| 2019/0352481 A1 | 11/2019 | Duvall et al. | |
| 2019/0375881 A1* | 12/2019 | Grassini | C08G 18/632 |
| 2020/0087437 A1 | 3/2020 | Kamm et al. | |
| 2020/0283561 A1 | 9/2020 | Parks | |
| 2020/0339733 A1 | 10/2020 | Rider et al. | |

\* cited by examiner

PROCESSES FOR MAKING MOLDED FLEXIBLE FOAMS AND FLEXIBLE FOAMS PRODUCED THEREBY

FIELD

This specification pertains generally to processes for making molded flexible foams, as well as to foams produced from such processes. Such foams may be suitable for use as ergonomic floor mats.

BACKGROUND

Flexible polyurethane foams are used in numerous applications. They are produced by reacting an appropriate polyisocyanate and an isocyanate-reactive compound, often a polyol, in the presence of a blowing agent. One use of such flexible foams is in the production of ergonomic floor mats. These floor mats are sometimes referred to as anti-fatigue mats, as they seek to prevent or reduce fatigue of persons standing on the floor mat for long periods of time. Such floor mats may also act to reduce or prevent pain in the knees, back or waist and can also provide a slip resistant surface.

Ergonomic floor mats are often formed of a flexible polyurethane foam layer that can have excellent shock-absorbing property. A fabric cover is often applied to the polyurethane foam layer to provide an aesthetically pleasing look and uniform texture. The polyurethane foam layer is often produced using an "open-pour" molding process in which a polyurethane foam-forming composition is mixed by a mixing head and poured into a mold, the mold is closed, and the composition allowed to react in the mold to form a flexible polyurethane molded foam. The molded polyurethane foam is removed from the mold to complete manufacture of the floor mat.

In order to provide sufficient manufacturing productivity, it is important that the foam-forming composition exhibit excellent cure properties so that the molded foam can be rapidly removed from the mold without damage to the foam resulting from residual stickiness. On the other hand, when using an open pour process in particular, it is important that the foam-forming composition flow well into the mold once mixed. Historically, foam-forming compositions employing phthalates and tin catalysts have been successfully employed in such processes to provide the necessary productivity and product quality. These materials, however, are subject to scrutiny from a health and environmental standpoint. Thus, it is sometimes desirable to eliminate their use.

As a result, it would be desirable to provide a process for producing a molded flexible foam that utilizes a foam-forming composition that can, if desired, be phthalate and tin free, while still providing manufacturing productivity and product quality that is at least comparable to its phthalate and tin-containing counterparts.

The inventions described in this specification were made in view of the foregoing.

SUMMARY

In certain respects, the present disclosure is directed to processes for making a molded flexible foam. The processes comprise: (a) depositing a foam-forming reaction mixture onto a surface of a mold cavity, and (b) allowing the foam-forming reaction mixture to react in the mold cavity. In these processes, the foam-forming reaction mixture comprises: (1) a polyisocyanate present in an amount of less than 45% by weight, based on the total weight of the foam-forming reaction mixture; (2) an isocyanate-reactive composition comprising at least 50% by weight, based on the total weight of polyol in the isocyanate-reactive composition, of a polyether polyol (I), polyether polyol (I) having a functionality of greater than 2, an oxyethylene content of 0 to 50% by weight, based on the total weight of polyether polyol (I), more than 50 mol % of primary OH groups, and an OH number of 8 to 112 mg KOH/g; (3) a blowing agent comprising water present in an amount of at least 0.5% by weight, based on the total weight of the foam-forming reaction mixture; and (4) a tin-free metallic catalyst composition comprising a bismuth-based catalyst and a zinc-based catalyst.

This disclosure is also directed to, among other things, flexible foams made by such processes, as well as to such foams that are embodied as a floor mat.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents, each numerical parameter described in this specification should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. The term "hydroxyl number", as used herein, refers to the number of reactive hydroxyl groups available for reaction, and is expressed as the number of milligrams of potassium hydroxide equivalent to the hydroxyl content of one gram of the polyol, measured according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

Equivalent weights and molecular weights given herein are number average equivalent weights and number average molecular weights respectively, as determined, unless indicated otherwise, by gel-permeation chromatography (GPC) using a method based on DIN 55672-1, employing chloroform as the eluent with a mixed bed column (Agilent PL Gel; SDVB; 3 micron Pore diameter: 1× Mixed-E+5 micron Pore diameter: 2× Mixed-D), refractive index (RI) detection and calibrated with polyethylene glycol as the standard.

The inventions described in this specification relate to production of flexible foams. The term "flexible foam", as used herein, refers to foams that have a ratio of tensile strength to compressive strength, at 25% deflection, of at least 15:1, such as 15 to 70:1, or, in some cases 15 to 60:1, as set forth in "Polyurethanes: Chemistry and Technology, Part II Technology," J. H. Saunders & K. C. Frisch, Interscience Publishers, 1964, page 117, the cited portion of which being incorporated herein by reference. In addition, in some implementations, the flexible foam also has a % elongation of at least 100%, such as at least 130%, at least 150%, or, in some cases at least 200%. Moreover, in some implementations, the flexible foams produced according to the methods of this specification have a 65% compression force deflection of 1.5 to 10 psi, 1.5 to 8 psi, or, in some cases, 1.5 to 6 psi. All of the foregoing property testing of flexible foams for purposes of the present invention is done in accordance with ASTM D3574-11. By contrast, as will be appreciated, a rigid foam is characterized as having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders &K. C. Frisch, Interscience Publishers, 1964, page 239, the cited portion of which being incorporated herein by reference.

The flexible foams produced according to the processes of this specification, in some implementations, have a density, measured according to ASTM D 3574-17 Test A, of no more than 20 lb/ft$^3$ (no more than 0.32 g/cm$^3$), such as 10 to 20 lb/ft$^3$ (0.16 to 0.32 g/cm$^3$), or, in some cases, 13 to 17 lb/ft$^3$ (0.21 to 0.27 g/cm$^3$). In some implementations, the flexible foams produced according to the processes of this specification exhibit an Asker C hardness, measured according to ASTM D2240-15e1, of 10 to 40, 15 to 40, or, in some cases, 25 to 35.

This specification relates to producing such flexible foams by process that comprises: (a) depositing a foam-forming reaction mixture onto a surface of a mold cavity, and (b) allowing the reaction mixture to react in the mold cavity.

More specifically, in some implementations, a "one-shot" open-pour cold molding process is employed. In a "one-shot" molded foam process, measured amounts of ingredients are deposited into a mold of a desired shape and the foam rises and fills the mold cavity to yield a part with the shape needed for the intended application. In an open-pour process, the foam-forming reaction mixture is poured into an open mold until the desired amount of the reaction mixture has been charged and then the mold is closed. In cold molding, the foam-forming reaction mixture is introduced into the mold, generally at a modestly elevated temperature, such as 130° F. to 150° F. (54° C. to 66° C.), and demolded after a curing cycle of a few minutes, such as 2 to 6 minutes, without in-mold oven cure. Cell opening may be accomplished after demold by crushing or cell opening may be done in the mold through use of timed pressure release (TPR) or timed partial pressured release (TPPR), or combinations of these techniques with modest mechanical crushing. The foam is then often cured at an elevated temperature.

In the process of this specification, the foam-forming reaction mixture includes a polyisocyanate. As used herein, the term "polyisocyanate" encompasses diisocyanates as well as higher functionality polyisocyanates.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates, such as 2,4,6-toluene triisocyanate; and higher functionality polyisocyanates, such as 4,4'-dimethyl-diphenylmethane-2,2',5,5'-tetraisocyanate and the polymethylene polyphenyl-polyisocyanates.

Undistilled or crude polyisocyanates may also be used. Crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of 25 to 35 weight percent, such as 29 to 34 weight percent (according to method MDI-01-01), and/or an isocyanate functionality of 2.2 to 3.2, such as 3.0 to 3.2 such as those based on a polyether polyol or polyester polyol and diphenylmethane diisocyanate.

In certain implementations, the polyisocyanate comprises a methylene-bridged polyphenyl polyisocyanate and/or a prepolymer of methylene-bridged polyphenyl polyisocyanate having an average functionality of from 1.8 to 3.5, such as from 2.0 to 3.1, isocyanate moieties per molecule and an NCO content of from 25 to 32 weight percent or 22 to 24 weight percent.

In the foam-forming reaction mixtures used in the processes of this specification, the polyisocyanate is present in an amount of less than 45% by weight, such as less than 40% by weight, or, in some cases, less than 35% by weight, based on the total weight of the foam-forming reaction mixture. In some of these implementations, the polyisocyanate is present in an amount of at least 20% by weight, at least 25% by weight, or, in some cases, at least 30% by weight, based on the total weight of the foam-forming reaction mixture.

The foam-forming reaction mixture also comprises an isocyanate-reactive composition. More particularly, the isocyanate-reactive composition comprises a polyether polyol having a functionality of greater than 2, such as greater than 2 up to 6, such as 3 to 6, 3 to 5, 3 to 4, or, 3, an oxyethylene content of 0 to 50% by weight, such as 10 to 30% by weight, based on the total weight of the polyether polyol, more than 50 mol %, such as 80 to 90 mole %, of primary OH groups, and an OH number of 8 to 112 mg KOH/g, such as 20 to 50 mg KOH/g or 25 to 35 mg KOH/g.

Suitable such polyether polyols include alkylene oxide addition products of starter compounds with Zerewitinoff-active hydrogen atoms. Suitable starter compounds with Zerewitinoff-active hydrogen atoms which are used for the production of such polyether polyols often have a hydroxyl functionality of 2 to 8, 2 to 6, 3 to 5 or, in some cases, 3. Specific examples of suitable hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydro-quinone, pyrocatechol, resorcinol, bisphenol F, bisphenol A, 1,3,5-trihydroxybenzene, and condensation products of formaldehyde and phenol or melamine or urea which contain methylol groups.

Specific examples of alkylene oxides suitable for preparing such polyether polyols include ethylene oxide, propylene oxide, 1,2-butylene-oxide or 2,3-butylene oxide and styrene oxide. In some cases, propylene oxide and ethylene oxide are introduced into the reaction mixture individually, in a mixture or successively. If the alkylene oxides are metered in successively, the resulting products contain polyether chains with block structures. Products with ethylene oxide blocks are characterized by increased concentrations of primary end groups.

In the reaction mixtures used in the processes of this specification, the foregoing polyether polyol having a functionality of greater than 2, an oxyethylene content of 0 to 50% by weight, more than 50 mol % of primary OH groups, and an OH number of 8 to 112 mg KOH/g is present in an amount of at least 50% by weight, such as at least 80% by weight, 80% to 99% by weight, or 85% to 95% by weight, based on the total weight of polyol in the isocyanate-reactive composition.

The isocyanate-reactive composition may, and often does, contain additional polyols different from the polyether polyol described above.

For example, in some implementations, the isocyanate-reactive composition further comprises a polyether polyol with a functionality of 2 to 6, such as 3, an oxyethylene content of >60% by weight, such as >70% by weight, based on the total weight of the polyether polyol, at least 50 mol %, such as 50 to 60 mole %, of primary OH groups, and a hydroxyl number of 10 to 112 mg KOH/g, such as 30 to 50 mg KOH/g.

Such polyether polyols are often alkylene oxide addition products of starter compounds with Zerewitinoff-active hydrogen atoms. Suitable starter compounds with Zerewitinoff-active hydrogen atoms which are used for such polyether polyols have functionalities of 2 to 8, 2 to 6, 3 to 5, or, in some cases, 3, and are hydroxy-functional. Specific examples of suitable hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydro-quinone, pyrocatechol, resorcinol, bisphenol F, bisphenol A, 1,3,5-trihydroxybenzene, and condensation products of formaldehyde and phenol or melamine or urea which contain methylol groups.

Examples of alkylene oxides suitable for preparing such polyether polyols are ethylene oxide, propylene oxide, 1,2-butylene-oxide or 2,3-butylene oxide and styrene oxide. In some implementations, propylene oxide and ethylene oxide are introduced into the reaction mixture individually, in a mixture or successively. If the alkylene oxides are metered in successively, the resulting products contain polyether chains with block structures.

In some implementations, the foregoing polyether polyol having a functionality of 2 to 6, an oxyethylene content of >60% by weight, at least 50 mol %, of primary OH groups, and a hydroxyl number of 10 to 112 mg KOH/g is present in an amount of no more than 10% by weight, such as 0.1% to 10% by weight, 0.1% to 5% by weight, or 1% to 5% by weight, based on the total weight of polyol in the isocyanate-reactive composition.

In addition, in some implementations, the foam-forming reaction mixture may include a compound with at least two isocyanate-reactive hydrogen atoms and with a molecular weight from 62 to 399. Examples of such substances, which are suitable for use in the foam-forming reaction mixtures used in the processes of this specification are, by way of example, ethylene glycol, propylene glycol-(1,2) and -(1,3), butylene glycol-(1,4) and -(2,3), pentanediol-(1,5), hexanediol-(1,6), octanediol-(1,8), neopentylglycol, 1,4-bis-hydroxymethyl-cyclohexane, 2-methyl-1,3-propanediol, dibromobutenediol, glycerol, trimethylolpropane, hexanetriol-(1,2,6), trimethylolethane, pentaerythritol, quinitol, mannitol, sorbitol, castor oil, diethylene glycol, triethylene glycol, tetraethyleneglycol, higher polyethylene glycols having a molecular weight of up to 399, dipropylene glycol, higher polypropylene glycols having a molecular weight of up to 399, dibutylene glycol, higher polybutylene glycols having a molecular weight of up to 399, 4,4'-dihydroxydiphenylpropane, dihydroxymethyl-hydroquinone, ethanolamine, diethanolamine, N-methyl-diethanolamine, triethanolamine and 3-aminopropanol.

In some implementations, the compound with at least two isocyanate-reactive hydrogen atoms and with a molecular weight from 62 to 399 comprises an amine-initiated polyether polyol. More specifically, in some implementations, such an amine-initiated polyether polyol may comprise an alkanolamine-initiated polyether polyol. As used herein, "alkanolamine-initiated polyether polyol" refers to a polyether polyol prepared by reacting an alkylene oxide with one or more suitable initiators in the presence of a suitable catalyst, in which the initiator comprises one or more alkanolamines. Suitable catalysts including basic catalysts (such as sodium or potassium hydroxide or tertiary amines such as methyl imidazole) and DMC catalysts. In the inventions described herein, each of the recited polyether polyols, including the are different from each other.

As used herein, the term "alkanolamine" refers to compounds represented by the formula:

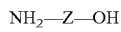

NH$_2$—Z—OH in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

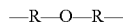

—R—O—R— where each R, independently of the other, represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Exemplary alkylene oxides are ethylene oxide, propylene oxide, butylene oxide, styrene oxide, and epichlorohydrin, or a mixture of any two or more thereof.

In some implementations, the alkanolamine-initiated polyether polyol has an OH number of at least 500 mg KOH/g, such as 500 to 900 mg KOH/g, 600 to 800 mg KOH/g, or, in some cases, 680 to 720 mg KOH/g, and a functionality of 2.5 to 4, such as 2.5 to 3.5.

In some implementations, the alkanolamine-initiated polyether polyol is utilized in an amount of up to 10% by weight, such as 0.1 to 10% b weight, 0.1 to 5% by weight, or 1 to 5% by weight, based on the total weight of polyol in the isocyanate-reactive composition.

Further, in some implementations, the isocyanate-reactive composition may comprise yet other polyols that are different from the polyols described thus far. In some implementations, the total amount of polyol included in the foam-forming reaction mixture is such that polyisocyanate and polyol are mixed at an isocyanate index of 50 to 150, such as 60 to 105, 65 to 95, or 85 to 95.

As indicated earlier, the foam-forming reaction mixture also comprises a blowing agent. Suitable blowing agent include reactive blowing agents and physical blowing agents. In some implementations, a carbon dioxide generating reactive blowing agent, such as water and/or a formate-blocked amine, is employed. More particularly, in some implementations. water is present in an amount of at least 0.5% by weight, such as 0.5 to 5% by weight, 0.5 to 2% by weight or 0.5 to 1.5% by weight, based on the total weight of the foam-forming reaction mixture.

Any of a variety of physical blowing agents may be used, if desired. Suitable physical blowing agents include hydrocarbons, such as butane, n-pentane, cyclopentane, hexane, and/or isopentane (i.e. 2-methylbutane). Other suitable physical blowing agents include halogenated blowing agents, such as chlorofluorocarbons ("CFCs"), hydrochlorofluorocarbons ("HCFCs"), hydrofluorocarbons ("HFCs") and/or hydroflouroolefins ("HFOs"), including hydrochlorofluoroolefins ("HCFOs"). For example, suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some cases, the boiling point, at atmospheric pressure, of the HCFO is at least −25° C., at least −20° C., or at least −19° C., and 40° C. or less, 35° C. or less, or, in some cases 33° C. or less. The HCFO may have a boiling point, at atmospheric pressure, of, for example, −25° C. to 40° C., or −20° C. to 35° C., or −19° C. to 33° C.

In certain implementations, however, water is essentially the sole blowing agent present in the foam-forming reaction mixture. In other words, the foam-forming reaction mixture is substantially or, in some cases, completely free of physical blowing agents (such as other halogenated blowing agents, such as CFCs, HCFCs, HFCs and/or HFOs). As used herein, the term "substantially free" when used with reference to these blowing agents, means that the blowing agent is present, if at all, in an amount of less than 10% by weight, such as less than 1% by weight or less than 0.1% by weight, based on the total weight of blowing agent in the foam-forming reaction mixture.

The foam-forming reaction mixtures employed in the processes of this specification comprise a metallic catalyst composition. More specifically, the metallic catalyst composition comprises bismuth-based catalyst and a zinc-based catalyst. Specific examples of suitable metallic catalysts include, for example, organic salts and Lewis acid halides. Specific examples of zinc-based catalysts that are suitable for use in the foam-forming reaction mixtures used in the processes of this specification include, but are not limited to, any of a variety of zinc salts of carboxylic acids, such as zinc acetate, zinc neodecanoate, zinc octoate, zinc hexanoate, zinc acetylacetonate, and zinc 2-ethylhexanoate, as well as zinc carbene compounds or complexes formed from zinc and 1,3-dicarbonyl compounds, such as zinc acetylacetonate. Specific examples of bismuth-based catalysts that are suitable for use in the foam-forming reaction mixtures used in the processes of this specification include, but are not limited to, bismuth carboxylates, such as where bismuth is in the oxidation state of 3. In some implementations, the carboxylic acid used for salt formation has 6 to 18, such as or 6 to 12 or 8 to 12, carbon atoms. Specific examples of such bismuth carboxylates include, for example, bismuth (III) neodecanoate, bismuth 2-ethylhexanoate and bismuth octanoate, among others.

In some implementations, the zinc-based catalyst and the bismuth-based catalyst are present such that the ratio, by weight, of bismuth complex that is present to zinc complex that is present, by weight, is 1:1 to 5:1, such as 1.5:1 to 4:1, or 2:1 to 4:1.

As previously indicated, the metallic catalyst compositions employed in the foam-forming reaction mixtures used in the processes of this specification are "tin-free". As used herein, "tin-free" means that a tin-based catalyst is present in the metallic catalyst composition in an amount of less than 10% by weight, in some cases less than 1% by weight or less than 0.1% by weight, based on the total weight of the metallic catalyst composition. In some implementations, the metallic catalyst composition contains no tin-based catalyst.

Moreover, in some implementations, the metallic catalyst composition is essentially free of other metal-based catalyst, such as titanium-based, sodium-based, lead-based, mercury-based, zirconium-based, and/or lithium-based catalysts. As used in this context, "essentially free" means that such other metal-based catalyst is present in an amount of less than 10% by weight, less than 1% by weight, or, in some cases, less than 0.1% by weight, based on the total weight of the metallic catalyst composition. In some cases, the metallic catalyst composition contains no metal-based catalyst aside from the zinc-based catalyst and the bismuth-based catalyst.

It was discovered, surprisingly, that use of the particular metallic catalyst composition described herein in the foam-forming reaction mixtures used in the processes of this specification resulted in sufficiently quick cure and sufficient elimination of post cure foam stickiness, such that manufacturing productivity and product quality could be maintained relative to use of a phthalate and tin-containing foam-forming reaction mixture in such a process.

It has also been observed, however, that such results can be lost if a substantial amount of $CO_2$-producing carbamic acid is present in the foam-forming reaction mixture. As a result, in some implementations, the foam-forming reaction mixture used in the processes of this specification is substantially free, or, in some cases, completely free, of $CO_2$-producing carbamic acid. As used herein, "substantially free" when used in this context means that any $CO_2$-producing carbamic acid in the foam-forming reaction mixture is not present in an amount sufficient to detrimentally effect the surprising and desirable cure properties described above. $CO_2$-producing carbamic acids, as used in this specification, refers to the reaction product of $CO_2$ with a primary and/or secondary amine, such as an alkanolamine, such as those described above. As used herein, "completely free" when used in this context manes that no measurable amount of $CO_2$-producing carbamic acid is present in the foam-forming reaction mixture.

In some implementations, the foam-forming reaction mixture further comprises a tertiary amine catalyst. Specific examples of suitable tertiary amine catalysts include, but are not limited to triethylamine, triethylenediamine, tributylamine, N-methylmorpholine, N-ethylmorpholine, N-cocomorpholine, N,N,N',N''-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N, N',N'-tetramethyl-1,3-butane diamine, N,N-dimethylphenylethylamine, 1,2-dimethylimidazole, 2-methylimidazole, N-cyclohexylmorpholine, N-hexyl dicyclohexyl amine, methyl dicyclohexyl amine, butyl dicyclohexylamine, octadecyl dicyclohexylamine, ethyl cyclohexyl phenylamine, dicyclohexyl phenyl amine, triphenyl amine, N,N-di-benzyl aniline, dibenzyl cyclohexylamine, tricyclohexylamine, tricyclooctyl amine; tri (1-cyclohexyl-ethyl-2) amine, di-(tert-butylcyclohexyl)methyl amine, (2-ethyl-1-hexenyl)diphenyl amine, 1-(2-ethyl-i hexenyl)piperidine, 1-(tolyl)piperidine, 1-(cyclobutyl)-3-butyl piperidine, 1-(cycloheptyl)-2,3,6-tri-methyl piperidine, 1-(cyclohexyl)-2,2,6,6-tetramethyl piperidine, N-phenyl dicyclohexyl amine, N-p-tolyl dicyclohexyl amine, N-benzyl dicyclohexyl amine, N-methyl diphenyl amine, 4-(cyclopentyl)morpholine, 4-(cyclohexyl)-2,6-dimethyl morpholine, 4-(benzyl) morpholine, and 4-(m-cumenyl) morpholine, and mixtures thereof.

In some implementations, the tertiary amine catalyst is present in an amount of 0.001 to 2.0% by weight, such as 0.01 to 1.0% by weight, 0.1 to 0.5% by weight, or, in some cases, 0.2 to 0.4% by weight, by weight of the foam-forming reaction mixture.

In some implementations, the inventions of this specification also comprise a surfactant. Any suitable surfactant can be used, including organosilicon compounds, such as polysiloxane-polyalkyene-block copolymers, such as a polyether-modified polysiloxane. Useful surfactants also include polyethylene glycol ethers of long chain alcohols, tertiary amine or alkanolamine salts of long chain alkyl acid sulfate esters, alkylsulfonic esters, or alkylarylsulfonic acids. In some cases, surfactant is utilized in an amount of 0.1 to 5.0% by weight, such as 1 to 3% by weight, based on the total weight of the isocyanate-reactive composition.

Additional materials which may optionally be included in the foam-forming reaction mixture include: pigments, colorants, fillers, antioxidants, flame retardants, and stabilizers. Exemplary useful flame retardants include, but are not limited to, reactive bromine based compounds and chlorinated phosphate esters, including but not limited to, tri(2-chloroethyl)phosphate (TECP), tri(1,3-dichloro-2-propyl) phosphate, tri(1-chloro-2-propyl)phosphate (TCPP) and dimethyl propyl phosphate (DMPP).

As earlier indicated, the processes of this specification comprising forming the foam in a mold. The material used for the molds may be a metal, such as aluminum, or a synthetic material, such as an epoxide resin. The reaction mixture foams up inside the mold to form the shaped product. Foaming may be carried out to produce a product having a cellular surface or it may produce a product having a non-cellular skin and a cellular core. In some implementations, the desired foam product is produced by introducing just sufficient reaction mixture into the mold to fill the mold with foam after the reaction. Alternatively, if desired, a larger quantity of foam-forming reaction mixture than is necessary to fill the interior of the mold with foam may be introduced, such as procedure being known as "overcharging".

The process of foaming inside molds is frequently carried out with the aid of an "external mold release agent", such as a silicone oil. "Internal mold release agents" may also be used in the foam-forming reaction mixture, if desired.

This specification also relates to the use of the flexible foams produced as described herein. That is, the flexible polyurethane foams produced as described in this specification may find use as an ergonomic floor mat, though other uses can be readily envisaged.

Various aspects of the subject matter described herein are set out in the following numbered clauses:

Clause 1. A process for making a molded flexible foam, comprising: (a) depositing a foam-forming reaction mixture onto a surface of a mold cavity, and (b) allowing the foam-forming reaction mixture to react in the mold cavity, wherein the foam-forming reaction mixture comprises: (1) a polyisocyanate present in an amount of less than 45% by weight, based on the total weight of the foam-forming reaction mixture; (2) an isocyanate-reactive composition comprising at least 50% by weight, based on the total weight of polyol in the isocyanate-reactive composition, of a polyether polyol (I), polyether polyol (I) having a functionality of greater than 2, an oxyethylene content of 0 to 50% by weight, based on the total weight of polyether polyol (I), more than 50 mol % of primary OH groups, and an OH number of 8 to 112 mg KOH/g; (3) a blowing agent comprising water present in an amount of at least 0.5% by weight, based on the total weight of the foam-forming reaction mixture; and (4) a tin-free metallic catalyst composition comprising a bismuth-based catalyst and a zinc-based catalyst Clause 2. The process of clause 1, with the proviso that the reaction mixture is substantially free, or completely free, of $CO_2$-producing carbamic acid.

Clause 3. The process of clause 1, wherein the flexible foam has a density, measured according to ASTM D 3574-17 Test A, of no more than 20 lb/ft$^3$ (no more than 0.32 g/cm$^3$), 10 to 20 lb/ft$^3$ (0.16 to 0.32 g/cm$^3$), or 13 to 17 lb/ft$^3$ (0.21 to 0.27 g/cm$^3$).

Clause 4. The process of clause 1 or clause 2, wherein the flexible foam exhibits Asker C hardness, measured according to ASTM D2240-15e1, of 10 to 40, 15 to 40, or 25 to 35.

Clause 5. The process of one of clause 1 to clause 4, wherein the foam-forming reaction mixture is poured into an open mold until the desired amount of the reaction mixture has been charged and then the mold is closed.

Clause 6. The process of one of clause 1 to clause 5, wherein the foam-forming reaction mixture is introduced into the mold at a temperature of 130° F. to 150° F. (54° C. to 66° C.), and demolded after a curing cycle of 2 to 6 minutes, without in-mold oven cure.

Clause 7. The process of one of clause 1 to clause 6, wherein the polyisocyanate comprises an aromatic, aliphatic, cycloaliphatic polyisocyanate or a combinations thereof, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, an isomer of hexahydro-toluene diisocyanate, isophorone diisocyanate, dicyclo-hexylmethane diisocyanate, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; 2,4,6-toluene triisocyanate; 4,4'-dimethyl-diphenylmethane-2,2',5,5'-tetraisocyanate; and a polymethylene polyphenyl-polyisocyanate.

Clause 8. The process of one of clause 1 to clause 7, wherein the polyisocyanate comprises a prepolymer containing NCO groups and having an NCO content of 25 to 35 weight percent, such as 29 to 34 weight percent (according to method MDI-01-01), and/or an isocyanate functionality of 2.2 to 3.2, such as 3.0 to 3.2, such as those based on a polyether polyol or polyester polyol and diphenylmethane diisocyanate.

Clause 9. The process of one of clause 1 to clause 8, wherein the polyisocyanate comprises a methylene-bridged polyphenyl polyisocyanate and/or a prepolymer of methylene-bridged polyphenyl polyisocyanate having an average functionality of from 1.8 to 3.5, such as from 2.0 to 3.1, isocyanate moieties per molecule, and an NCO content of from 25 to 32 weight percent, such as 22 to 24 weight percent.

Clause 10. The process of one of clause 1 to clause 9, wherein the polyisocyanate is present in an amount of less than 40% by weight or less than 35% by weight, based on the total weight of the foam-forming reaction mixture.

Clause 11. The process of one of clause 1 to clause 10, wherein the polyisocyanate is present in an amount of at least 20% by weight, at least 25% by weight, or at least 30% by weight, based on the total weight of the foam-forming reaction mixture.

Clause 12. The process of one of clause 1 to clause 11, wherein polyether polyol (I) has a functionality of greater than 2 up to 6, 3 to 6, 3 to 5, 3 to 4, or 3.

Clause 13. The process of one of clause 1 to clause 12, wherein polyether polyol (I) has an oxyethylene content of 10 to 30 wt %.

Clause 14. The process of one of clause 1 to clause 13, wherein polyether polyol (I) has 80 to 90 mole % of primary OH groups.

Clause 15. The process of one of clause 1 to clause 14, wherein polyether polyol (I) has an OH number of 20 to 50 mg KOH/g polyol or 25 to 35 mg KOH/g polyol.

Clause 16. The process of one of clause 1 to clause 15, wherein polyether polyol (I) comprises an alkylene oxide addition product of a starter compound with Zerewitinoff-active hydrogen atoms, wherein the starter compound has a hydroxyl functionality of 2 to 8, 2 to 6, 3 to 5, or 3.

Clause 17. The process of clause 16, wherein the starter compound comprises propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydro-quinone, pyrocatechol, resorcinol, bisphenol F, bisphenol A, 1,3,5-trihydroxybenzene, a condensation product of formaldehyde and phenol or melamine or urea which contains methylol groups, or a mixture thereof, and the alkylene oxide comprises ethylene oxide, propylene oxide, 1,2-butylene-oxide or 2,3-butylene oxide, styrene oxide, or a mixture thereof.

Clause 18. The process of one of clause 1 to clause 17, wherein polyether polyol (I) is present in an amount of at least 80% by weight, 80% to 99% by weight, or 85% to 95% by weight, based on the total weight of polyol in the isocyanate-reactive composition.

Clause 19. The process of one of clause 1 to clause 18, wherein the foam-forming reaction mixture further comprises a polyether polyol (II), polyether polyol (II) having a functionality of 2 to 6, such as 3, an oxyethylene content of >60% by weight, such as >70% by weight, based on the total weight of polyether polyol (II), at least 50 mol %, such as 50 to 60 mole %, of primary OH groups, and a hydroxyl number of 10 to 112 mg KOH/g, such as 30 to 50 mg KOH/g.

Clause 20. The process of clause 19, wherein polyether polyol (II) comprises an alkylene oxide addition product of a starter compound with Zerewitinoff-active hydrogen atoms, wherein the starter compound with Zerewitinoff-active hydrogen atoms comprises propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydro-quinone, pyrocatechol, resorcinol, bisphenol F, bisphenol A, 1,3,5-trihydroxybenzene, a condensation product of formaldehyde and phenol or melamine or urea which contains methylol groups, or a mixture thereof, and the alkylene oxide comprises ethylene oxide, propylene oxide, 1,2-butylene-oxide or 2,3-butylene oxide and styrene oxide.

Clause 21. The process of clause 19 or clause 20, wherein polyether polyol (II) is present in an amount of no more than 10% by weight, 0.1% to 10% by weight, 0.1% to 5% by weight, or 1% to 5% by weight, based on the total weight of polyol present.

Clause 22. The process of one of clause 1 to clause 21, wherein the foam-forming reaction mixture comprises a compound with at least two isocyanate-reactive hydrogen atoms and with a molecular weight from 62 to 399.

Clause 23. The process of clause 22, wherein the compound with at least two isocyanate-reactive hydrogen atoms and with a molecular weight from 62 to 399 comprises ethylene glycol, propylene glycol-(1,2) and -(1,3), butylene glycol-(1,4) and -(2,3), pentanediol-(1,5), hexanediol-(1,6), octanediol-(1,8), neopentylglycol, 1,4-bis-hydroxymethyl-cyclohexane, 2-methyl-1,3-propanediol, dibromobutene-diol, glycerol, trimethylolpropane, hexanetriol-(1,2,6), trimethylolethane, pentaerythritol, quinitol, mannitol, sorbitol, castor oil, diethylene glycol, triethylene glycol, tetraethyleneglycol, a higher polyethylene glycol having a molecular weight of up to 399, dipropylene glycol, dibutylene glycol, a higher polybutylene glycol having a molecular weight of up to 399, 4,4'-dihydroxy-diphenylpropane, dihydroxymethyl-hydroquinone, ethanolamine, diethanolamine, N-methyl-diethanolamine, triethanolamine, 3-aminopropanol, or a mixture thereof.

Clause 24. The process of clause 22 or clause 23, wherein the compound with at least two isocyanate-reactive hydrogen atoms and with a molecular weight from 62 to 399 comprises an amine-initiated polyether polyol.

Clause 25. The process of clause 24, wherein the amine-initiated polyether polyol comprises an alkanolamine-initiated polyether polyol.

Clause 26. The process of clause 25, wherein the alkanolamine-initiated polyether polyol is the reaction product of an alkylene oxide with one or more initiators, in which the initiator comprises one or more alkanolamines, wherein the alkanolamine is represented by the structure:

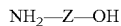

NH$_2$—Z—OH in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

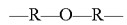

—R—O—R— where each R, independently of the other, represents a hydrocarbon radical having 2 to 3 carbon atoms.

Clause 27. The process of clause 26, wherein the alkanolamine comprises monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, or a mixture of any two or more thereof, and the alkylene oxide comprises ethylene oxide, propylene oxide, butylene oxide, styrene oxide, epichlorohydrin, or a mixture of any two or more thereof.

Clause 28. The process of one of clause 24 to clause 27, wherein the amine-initiated polyether polyol has an OH number of 500 to 900 mg KOH/g, 600 to 800 mg KOH/g, or 680 to 720 mg KOH/g.

Clause 29. The process of one of clause 24 to clause 28, wherein the amine-initiated polyether polyol has a functionality of 2.5 to 4, such as 2.5 to 3.5.

Clause 30. The process of one of clause 24 to clause 29, wherein the amine-initiated polyether polyol is present in an amount of 0.1 to 10% b weight, 0.1 to 5% by weight, or 1 to 5% by weight, based on the total weight of polyol in the isocyanate-reactive composition.

Clause 31. The process of one of clause 1 to clause 30, wherein the total amount of polyol included in the foam-forming reaction mixture is such that polyisocyanate and polyol are mixed at an isocyanate index of 50 to 150, 60 to 105, 65 to 95, or 85 to 95.

Clause 32. The process of one of clause 1 to clause 31, wherein the blowing agent comprises water present in an amount of 0.5 to 5% by weight, 0.5 to 2% by weight or 0.5 to 1.5% by weight, based on the total weight of the foam-forming reaction mixture.

Clause 33. The process of one of clause 1 to clause 32, wherein the foam-forming reaction mixture is substantially or completely free of physical blowing agent.

Clause 34. The process of one of clause 1 to clause 33, wherein the zinc-based catalyst comprises zinc acetate, zinc neodecanoate, zinc octoate, zinc hexanoate, zinc acetylacetonate, zinc 2-ethylhexanoate, or a mixture thereof, and the bismuth-based catalyst comprises bismuth(III) neodecanoate, bismuth 2-ethylhexanoate, bismuth octanoate, or a mixture thereof.

Clause 35. The process of one of clause 1 to clause 34, wherein the zinc-based catalyst and the bismuth-based catalyst are present such that the ratio, by weight, of bismuth complex that is present to zinc complex that is present, by weight, is 1:1 to 5:1, such as 1.5:1 to 4:1, or 2:1 to 4:1.

Clause 36. The process of one of clause 1 to clause 35, wherein the foam-forming reaction mixture is essentially free of titanium-based, sodium-based, lead-based, mercury-based, zirconium-based, and/or lithium-based catalysts.

Clause 37. The process of one of clause 1 to clause 35, wherein the metallic catalyst composition consists of a zinc-based catalyst and the bismuth-based catalyst.

Clause 38. The process of one of clause 1 to clause 37, wherein the foam-forming reaction mixture further comprises a tertiary amine catalyst, such as where the tertiary amine catalyst comprises triethylamine, triethylenediamine, tributylamine, N-methylmorpholine, N-ethylmorpholine, N-cocomorpholine, N,N,N',N''-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethylbenzylamine, pentamethyldiethylene triamine, N,N-dimethylcyclohexylamine, N,N,N',N'-tetramethyl-1,3-butane diamine, N,N-dimethyl-phenylethylamine, 1,2-dimethylimidazole, 2-methylimidazole, N-cyclohexylmorpholine, N-hexyl dicyclohexyl amine, methyl dicyclohexyl amine, butyl dicyclohexylamine, octadecyl dicyclohexylamine, ethyl cyclohexyl phenylamine, dicyclohexyl phenyl amine, triphenyl amine, N,N-di-benzyl aniline, dibenzyl cyclohexylamine, tricyclohexylamine, tricyclooctyl amine; tri (1-cyclohexyl-ethyl-2) amine, di-(tert-butylcyclohexyl)methyl amine, (2-ethyl-1-hexenyl)diphenyl amine, 1-(2-ethyl-i hexenyl)piperidine, 1-(tolyl)piperidine, 1-(cyclobutyl)-3-butyl piperidine, 1-(cycloheptyl)-2,3,6-tri-methyl piperidine, 1-(cyclohexyl)-2,2,6,6-tetramethyl piperidine, N-phenyl dicyclohexyl amine, N-p-tolyl dicyclohexyl amine, N-benzyl dicyclohexyl amine, N-methyl diphenyl amine, 4-(cyclopentyl)morpholine, 4-(cyclohexyl)-2,6-dimethyl morpholine, 4-(benzyl) morpholine, and 4-(m-cumenyl) morpholine, or a mixtures thereof.

Clause 39. The process of clause 38, wherein the tertiary amine catalyst is present in an amount of 0.001 to 2.0% by weight, 0.01 to 1.0% by weight, 0.1 to 0.5% by weight, or 0.2 to 0.4% by weight, by weight of the foam-forming reaction mixture.

Clause 40. The process of one of clause 1 to clause 39, wherein the foam-forming reaction mixture further comprises a surfactant comprising a polysiloxane-polyalkyene-block copolymer, such as a polyether-modified polysiloxane and/or a polyethylene glycol ether of a long chain alcohol, a tertiary amine or alkanolamine salt of long chain alkyl acid sulfate ester, a alkylsulfonic ester, or a alkylarylsulfonic acid, such as where the surfactant is present in an amount of 0.1 to 5.0% by weight or 1 to 3% by weight, based on the total weight of the isocyanate-reactive composition.

Clause 41. A flexible foam produced by the process of any one of clause 1 to clause 40.

Clause 42. A floor mat comprising the flexible foam of clause 41.

The non-limiting and non-exhaustive examples that follow are intended to further describe various non-limiting and non-exhaustive implementations without restricting the scope of the implementations described in this specification.

EXAMPLES

Foam-forming compositions were prepared using the following materials:

POLYOL 1: a glycerin-initiated polyether polyol (85% propylene oxide block/15% ethylene oxide block) having an OH number of 26-30 mg KOH/g, a functionality of 3, 80-90% primary OH groups, and a viscosity of 1000-1320 mPa·s @ 25° C.;

EG: ethylene glycol; SURFACTANT: silicone surfactant, Niax™ silicone L-5309, from Momentive Performance Materials Inc.;

CATALYST 1: DABCO®33-LV gel catalyst, 33% triethylene diamine in dipropylene glycol, from Evonik;

CATALYST 2: DABCO®1028 gel catalyst, 30% triethylenediamine-active amine in 70% 1,4 butane diol, from Evonik;

TIN CATALYST: Di-n-butyltin sulfide;

BISMUTH CATALYST: bismuth based carboxylate, DABCO® MB 20, from Evonik;

CATALYST 3: diethanolamine;

CATALYST 4: 2-methylpentamethylenediamine, DYTEK®A, from Invista;

CATALYST 5: Addocat 6410

CHAIN EXTENDER: glycerin

CATALYST 6: Bis-(dimethylaminopropyl)methylamine, POLYCAT® 77 from Evonik;

CATALYST 7: Zinc/Bismuth Neodecanoate blend, REAXIS®C708, from Reaxis Inc.;

CELL OPENER: polybutadiene/diisononyl phthalate, ORTEGOL®501, from Evonik;

POLYOL 2: a glycerin-initiated polyether polyol (72.7% ethylene oxide block and 27.3% propylene oxide block) having an OH number of 35-39 mg KOH/g and a functionality of 3;

POLYOL 3: a monoethanolamine-initiated polyether polyol having an OH number of 685 to 715, a functionality of 3, and a nitrogen content of 5.8% by weight, prepared by propoxylating monoethanolamine;

CARBAMIC ACID: A reaction product of carbon dioxide with monoethanolamine and N-methylaminoethanol in propylene glycol.

COLORANT: Reactint Black 2256 from Milliken Chemical

ISOCYANATE: a liquid modified 4,4'-diphenylmethane-diisocyanate (MDI) prepolymer; NCO content 22.6-23.1 wt. %; viscosity 550-800 mPa·s @ 25° C.

Example I

Polyol premixes were prepared using the ingredients and amounts (in parts by weight) set forth in Table 1. Formulations 1-11 are comparative examples. Formulations 12-14 are inventive examples.

TABLE 1

|  | 1 | 2 | 3 | 4 | 5 | 6 | 7 |
|---|---|---|---|---|---|---|---|
| POLYOL 1 | 93.92 | 91.92 | 91.93 | 93.68 | 91.68 | 91.48 | 91.18 |
| EG | 3.63 | 3.63 | 3.63 | 3.63 | 3.63 | 3.63 | 3.63 |
| SURFACTANT | 0.11 | 0.11 | 0.11 | 0.11 | 0.11 | 0.11 | 0.11 |
| CATALYST 1 | 0.135 | 0.135 | 0.135 | 0.135 | 0.135 | 0.235 | 0.135 |
| CATALYST 2 | 0.18 | 0.18 | 0.18 | 0.18 | 0.18 | 0.28 | 0.18 |
| TIN CATALYST | 0.014 | 0.014 | — | — | — | — | — |
| BIMUTH CATALYST | — | — | — | 0.25 | 0.25 | 0.25 | 0.25 |
| CATALYST 3 | — | — | — | — | — | — | 0.5 |
| CATALYST 4 | — | — | — | — | — | — | — |
| CATALYST 5 | — | — | — | — | — | — | — |
| CHAIN EXTENDER | — | — | — | — | — | — | — |
| CATALYST 6 | — | — | — | — | — | — | — |
| CATALYST 7 | — | — | — | — | — | — | — |
| CELL OPENER | 1 | — | — | 1 | — | — | — |
| POLYOL 2 | — | 3 | 3 | — | 3 | 3 | 3 |
| POLYOL 3 | — | — | — | — | — | — | — |
| CARBAMIC ACID | — | — | — | — | — | — | — |
| Distilled Water | 1.015 | 1.015 | 1.015 | 1.015 | 1.015 | 1.015 | 1.015 |
| COLORANT | — | — | — | — | — | — | — |

TABLE 1-continued

| TOTAL | 100.0 | 100.0 | 100.0 | 100.0 | 100.0 | 100.0 | 100.0 |
|---|---|---|---|---|---|---|---|
|  | 8 | 9 | 10 | 11 | 12 | 13 | 14 |
| POLYOL 1 | 91.39 | 90.99 | 90.99 | 91.28 | 91.68 | 89.68 | 90.68 |
| EG | 3.63 | 3.63 | 3.63 | 3.63 | 3.63 | 3.63 | 3.63 |
| SURFACTANT | 0.2 | 0.11 | 0.11 | 0.11 | 0.11 | 0.11 | 0.11 |
| CATALYST 1 | 0.235 | 0.25 | 0.25 | 0.135 | 0.135 | 0.135 | 0.135 |
| CATALYST 2 | 0.28 | 0.25 | 0.25 | 0.18 | 0.18 | 0.18 | 0.18 |
| TIN CATALYST | — | — | — | — | — | — | — |
| BIMUTH CATALYST | 0.25 | 0.25 | 0.25 | 0.25 | — | — | — |
| CATALYST 3 | — | — | — | — | — | — | — |
| CATALYST 4 | — | 0.5 | — | — | — | — | — |
| CATALYST 5 | — | — | 0.5 | — | — | — | — |
| CHAIN EXTENDER | — | — | — | 0.25 | — | — | — |
| CATALYST 6 | — | — | — | 0.15 | — | — | — |
| CATALYST 7 | — | — | — | — | 0.25 | 0.25 | 0.25 |
| CELL OPENER | — | — | — | — | — | — | — |
| POLYOL 2 | 3 | 3 | 3 | 3 | 3 | 3 | 3 |
| POLYOL 3 | — | — | — | — | — | — | 1 |
| CARBAMIC ACID | — | — | — | — | — | 1 | — |
| Distilled Water | 1.015 | 1.015 | 1.015 | 1.015 | 1.015 | 2.015 | 1.015 |
| COLORANT | — | — | — | — | — | 0.2 | — |
| TOTAL | 100.0 | 100.0 | 100.00 | 100.00 | 100.00 | 100.20 | 100.00 |

Free rise foams were prepared by combining the polyol premix with the ISOCYANATE at an isocyanate index of 85, for a total of 120 grams of material, using an air-powered mixer (~3000 rpm, 10 second mix). The foams were cut flush with the cup rim and free rise densities were calculated based on cup volume. Results are in Table 2.

TABLE 2

|  | 1A | 1B | 2A | 2B | 3 | 4A | 4B | 5A | 5B | 5C | 6 |
|---|---|---|---|---|---|---|---|---|---|---|---|
| Cream Time (sec) | 22 | 21 | 21 | 21 | 21 | 23 | 23 | 24 | 24 | 25 | 23 |
| Top of Cup (sec) | 95 | 93 | 87 | 86 | 132 | 84 | 79 | 87 | 86 | 86 | 69 |
| Gel Time (sec) | 90 | 89 | 85 | 83 | 140 | 80 | 75 | 85 | 85 | 84 | 70 |
| Rise Time (sec) | 140 | 145 | 145 | 145 | — | 180 | 180 | 200 | 190 | 190 | 150 |
| Tack free Time (sec) | 150 | 150 | 150 | 150 | 270 | 240 | 240 | 210 | 240 | 225 | 163 |
| Density (lbs/ft$^3$) | 8.9 | 8.3 | 8.2 | 8.1 | — | 9.04 | 8.44 | 9.33 | 9.08 | 9.26 | 8.70 |
| Lab Panel Notes: | Easy demold at 5 minutes | | looked similar to control, demolded well | | | difficult demold at 5 minutes, mold lid suctioned to foam, able to be pulled up with force with no damage to foam | | Could not demold at 5 minutes, extended to 7 minutes, difficult demold, sticky | | | |

|  | 7 | 8 | 9 | 10 | 11 | 12 |
|---|---|---|---|---|---|---|
| Cream Time (sec) | 24 | 22 | 21 | 17 | 24 | 21 |
| Top of Cup (sec) | 96 | 72 | 56 | 36 | 81 | 60 |
| Gel Time (sec) | 92 | 74 | 55 | 35 | 83 | 59 |
| Rise Time (sec) | 210 | 160 | 145 | 98 | 180 | 160 |
| Tack free Time (sec) | 240 | 170 | 160 | 120 | 190 | 165 |
| Density (lbs/ft$^3$) | 9.18 | 8.58 | 8.88 | 7.95 | 8.51 | 8.77 |
| Lab Panel Notes: | stickiness-weak skin on crown, pulls off during tapping | still sticky after cure | still sticky after cure time | remained sticky for additional 2 minutes | remained tacky | No demold issues after 5 minutes |

|  | 13 | 14 |
|---|---|---|
| Cream Time (sec) | 21 | 21 |
| Top of Cup (sec) | 80 | 64 |
| Gel Time (sec) | 80 | 64 |
| Rise Time (sec) | — | — |
| Tack free Time (sec) | 170 |  |
| Density (lbs/ft$^3$) | 9.01 | 8.53 |
| Notes: | Use of POLYOL 3 increased froth during mixing, which reduced visual "knit lines". part surface looked much more smooth, demolded well | |

Example II

Polyol premixes were prepared using the ingredients and amounts (in parts by weight) set forth in Table 3. Formulations 15-18 are inventive examples.

TABLE 3

|  | 15 | 16 | 17 | 18 |
|---|---|---|---|---|
| POLYOL 1 | 91.68 | 89.68 | 90.48 | 90.58 |
| EG | 3.63 | 3.63 | 3.63 | 3.63 |
| SURFACTANT | 0.11 | 0.11 | 0.11 | 0.11 |
| CATALYST 1 | 0.135 | 0.135 | 0.135 | 0.135 |
| CATALYST 2 | 0.18 | 0.18 | 0.18 | 0.18 |
| CATALYST 7 | 0.25 | 0.25 | 0.25 | 0.25 |
| POLYOL 2 | 3 | 3 | 3 | 3 |
| POLYOL 3 | — | 2 | 1 | 1 |
| distilled Water | 1.015 | 1.015 | 1.22 | 1.12 |
| COLORANT | 0.2 | 0.2 | 0.2 | 0.2 |
| TOTAL | 100.2 | 100.2 | 100.2 | 100.2 |
| Index: | 85 | 80 | 85 | 85 |
| ISOCYANATE | 43.87 | 43.87 | 49.39 | 47.55 |

Parts were molded using a mold (mold temperature 140° F.; dimensions of 12"×12"×0.75", with angled edges to mimic larger production mold) and hand mixed material (~3000 rpm, mixed 5 seconds then poured into the open mold, mold sealed, demold at 5 minutes). Machine molded parts were prepared using a low pressure Edge-Sweets low pressure machine using 80° F. chemical temperatures, a 5 minute demold time, and the same mold as previously described. Parts were molded with a target density of 15 pcf. Foam from Formulation 18 was tested for physical properties. Results are in Table 4.

TABLE 4

| Test | Units | Result |
|---|---|---|
| CLD-strength @ 50% compression | psi | 12.185 |
| CLD-strength @ 50% compression: aged | psi | 9.052 |
| Compression Set Cd | % | 24.5 |
| Compression Set Ct | % | 12.3 |
| Density | lb/ft3 | 15.39 |
| Average Tear Strength | pli | 4.08 |
| Max Tear Strength | pli | 4.59 |
| Tensile Strength | psi | 82.74 |
| Tensile Elongation | % | 213.9 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a molded flexible foam, comprising:
   (a) depositing a foam-forming reaction mixture onto a surface of a mold cavity, and
   (b) allowing the foam-forming reaction mixture to react in the mold cavity,
   wherein the foam-forming reaction mixture comprises:
   (1) a polyisocyanate present in an amount of less than 45% by weight, based on the total weight of the foam-forming reaction mixture;
   (2) an isocyanate-reactive composition comprising at least 80% by weight, based on the total weight of polyol in the isocyanate-reactive composition, of a polyether polyol (I), polyether polyol (I) having a functionality of greater than 2, an oxyethylene content of 0 to 50% by weight, based on the total weight of polyether polyol (I), more than 50 mol % of primary OH groups, and an OH number of 8 to 112 mg KOH/g;
   (3) a blowing agent comprising water present in an amount of at least 0.5% by weight, based on the total weight of the foam-forming reaction mixture; and
   (4) a tin-free metallic catalyst composition comprising a bismuth carboxylate and a zinc carboxylate, wherein the bismuth carboxylate and zinc carboxylate are present in a weight ratio of 1.5:1 to 5:1,
   wherein the foam-forming reaction mixture is substantially free of physical blowing agent, and
   wherein the flexible foam has a density, measured according to ASTM D 3574-17 Test A, of 10 to 20 lb/ft$^3$.

2. The process of claim 1, wherein the depositing comprises pouring the foam-forming reaction mixture into an open mold and the reacting occurs in a closed mold.

3. The process of claim 1, wherein polyether polyol (I) has a functionality of 3 to 5.

4. The process of claim 1, wherein polyether polyol (I) has an oxyethylene content of 10 to 30 wt % and has 80 to 90 mole % of primary OH groups.

5. The process of claim 1, wherein polyether polyol (I) has an OH number of 20 to 50 mg KOH/g polyol.

6. The process of claim 1, wherein the isocyanate-reactive composition further comprises a polyether polyol (II), polyether polyol (II) having a functionality of 2 to 6, an oxyethylene content of >60% by weight, based on the total weight of polyether polyol (II), at least 50 mol %, of primary OH groups, and a hydroxyl number of 10 to 112 mg KOH/g.

7. The process of claim 6, wherein polyether polyol (II) is present in an amount of 0.1% to 10% by weight, based on the total weight of polyol present.

8. The process of claim 1, wherein the isocyanate-reactive composition further comprises 0.1 to 10% by weight, based on the total weight of polyol in the isocyanate-reactive composition, of an alkanolamine-initiated polyether polyol with at least two isocyanate-reactive hydrogen atoms and with a molecular weight from 62 to 399 g/mol.

9. The process of claim 8, wherein the alkanolamine-initiated polyol has an OH number of 500 to 900 mg KOH/g and a functionality of 2.5 to 4.

10. The process of claim 1, wherein the total amount of polyol included in the foam-forming reaction mixture is such that polyisocyanate and polyol are mixed at an isocyanate index of 65 to 95.

11. The process of claim 1, wherein the blowing agent comprises water that is present in an amount of 0.5 to 1.5% by weight, based on the total weight of the foam-forming reaction mixture.

12. The process of claim 1, wherein the bismuth carboxylate and the zinc carboxylate are present in a weight ratio of 2:1 to 5:1.

13. The process of claim 1, wherein the metallic catalyst composition consists of the zinc-based catalyst and the bismuth-based catalyst.

14. The process of claim 11, wherein the blowing agent comprises water present in an amount of 0.5% to 0.8% by weight, based on the total weight of the foam-forming reaction mixture.

15. The process of claim 12, wherein the bismuth carboxylate and the zinc carboxylate are present in a weight ratio of 2:1 to 4:1.

16. A process for making a molded flexible foam, comprising:
(a) depositing a foam-forming reaction mixture onto a surface of a mold cavity, and
(b) allowing the foam-forming reaction mixture to react in the mold cavity,
wherein the foam-forming reaction mixture comprises:
(1) a polyisocyanate present in an amount of less than 45% by weight, based on the total weight of the foam-forming reaction mixture;
(2) an isocyanate-reactive composition comprising:
(i) at least 80% by weight, based on the total weight of polyol in the isocyanate-reactive composition, of a polyether polyol (I), polyether polyol (I) having a functionality of greater than 2, an oxyethylene content of 0 to 50% by weight, based on the total weight of polyether polyol (I), more than 50 mol % of primary OH groups, and an OH number of 8 to 112 mg KOH/g;
(b) 0.1% to 10% by weight, based on the total weight of polyol in the isocyanate-reactive composition, of a polyether polyol (II), polyether polyol (II) having a functionality of 2 to 6, an oxyethylene content of >60% by weight, based on the total weight of polyether polyol (II), at least 50 mol %, of primary OH groups, and a hydroxyl number of 10 to 112 mg KOH/g; and
(c) 0.1 to 10% by weight, based on the total weight of polyol in the isocyanate-reactive composition, of an alkanolamine-initiated polyether polyol with at least two isocyanate-reactive hydrogen atoms and with a molecular weight from 62 to 399 g/mol;
(3) a blowing agent comprising water present in an amount of at least 0.5% by weight, based on the total weight of the foam-forming reaction mixture; and
(4) a tin-free metallic catalyst composition comprising a bismuth carboxylate and a zinc carboxylate, wherein the bismuth carboxylate and zinc carboxylate are present in a weight ratio of 1.5:1 to 5:1,
wherein the foam-forming reaction mixture is substantially free of physical blowing agent, and
wherein the flexible foam has a density, measured according to ASTM D 3574-17 Test A, of 10 to 20 lb/ft$^3$.

17. The process of claim 16, wherein the alkanolamine-initiated polyol has an OH number of 500 to 900 mg KOH/g and a functionality of 2.5 to 4.

18. The process of claim 16, wherein the bismuth carboxylate and the zinc carboxylate are present in a weight ratio of 2:1 to 5:1.

19. The process of claim 18, wherein the bismuth carboxylate and the zinc carboxylate are present in a weight ratio of 2:1 to 4:1.

20. The process of claim 11, wherein the blowing agent comprises water that is present in an amount of 0.5 to 1.5% by weight, based on the total weight of the foam-forming reaction mixture.

* * * * *